March 7, 1944.  G. E. FORD ET AL  2,343,372
BIMETALLIC THERMOMETER
Filed May 17, 1943
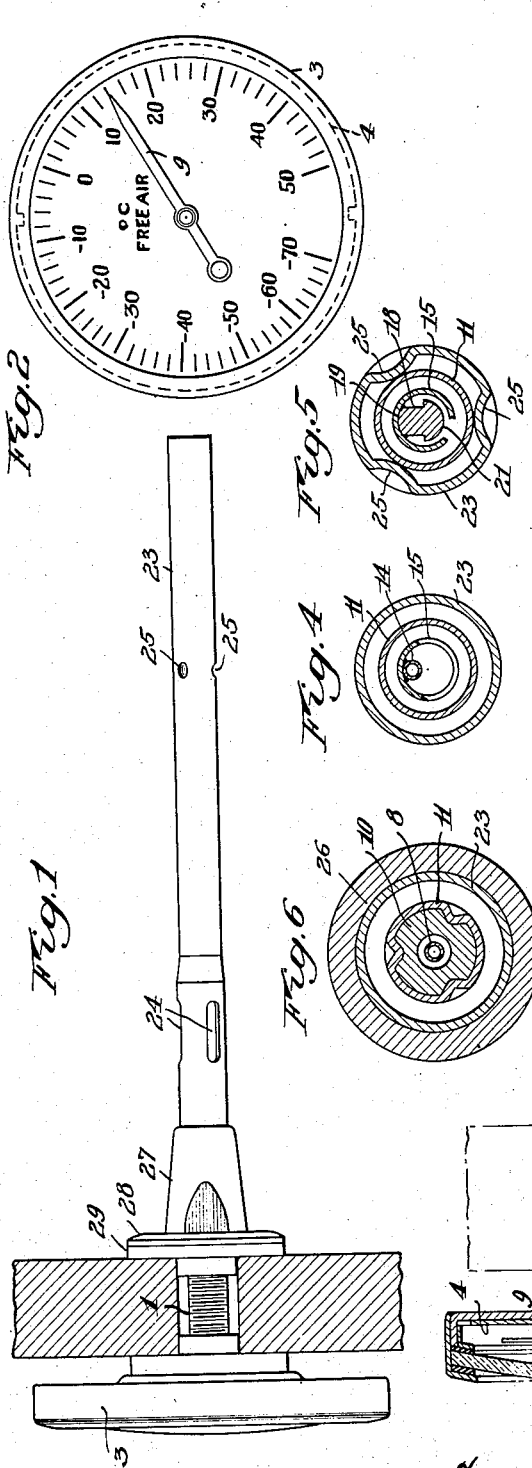
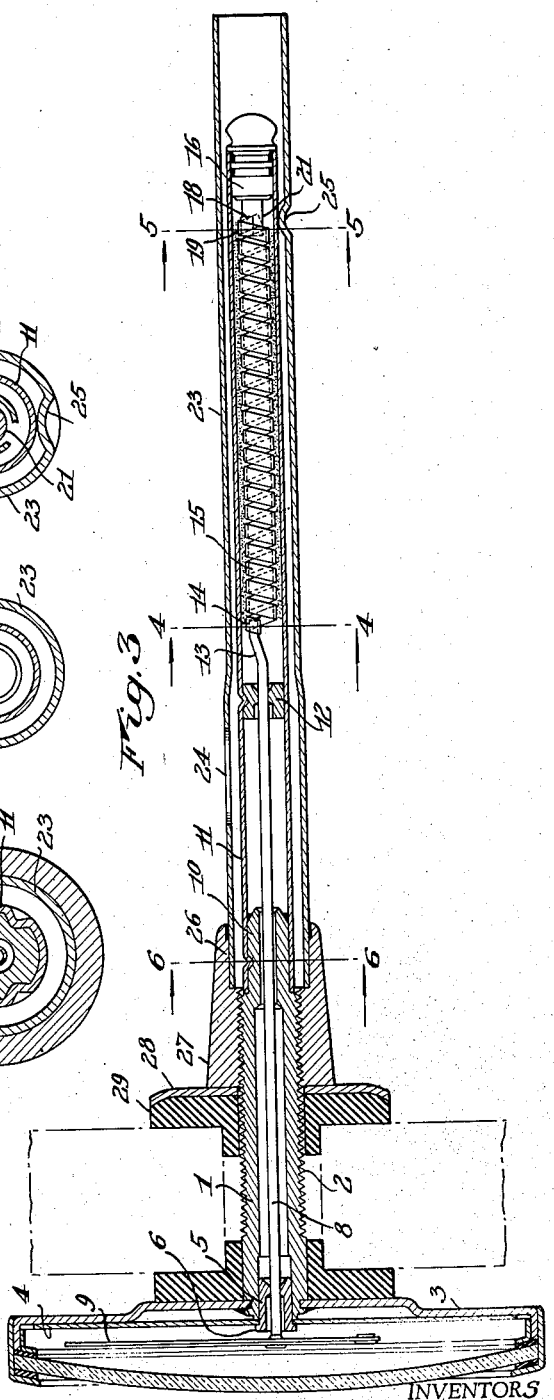
INVENTORS
George E. Ford
Warren W. Hastings
BY Harold E. Stonebraker
their Attorney Patented Mar. 7, 1944

2,343,372

UNITED STATES PATENT OFFICE 2,343,372

BIMETALLIC THERMOMETER

George E. Ford and Warren W. Hastings, Brighton, N. Y., assignors to Rochester Manufacturing Co., Inc., Rochester, N. Y., a corporation of New York Application May 17, 1943, Serial No. 487,204

15 Claims. (Cl. 73—367)

This invention relates to a bimetallic thermometer, with particular reference to the type of construction designed for use on aircraft, and it has for its purpose to afford a practical construction that can be economically manufactured, which is highly sensitive and accurate for all temperatures within a given range, and in which the bimetallic coil and other parts are characterized by greater strength and rigidity than heretofore, in addition to freedom from disadvantageous effects of vibration and jar to which such an instrument is usually subjected in actual use.

In a more particular aspect, the invention has for its purpose to afford a construction that insures a true, coaxial relation of the bimetallic coil and indicator shaft, a solid permanent connection between the bimetallic coil and the elements to which it is connected, efficient bearings for the indicator shaft that maintain the latter accurately in proper position and permit ready adjustment of the dial plate for calibration, and a sunshield rigidly mounted on a fastening member that is threaded on a support so that any strain imposed on the sunshield by a jar or striking object is taken by the fastening member and support while the more delicate parts such as the bimetallic coil and surrounding tubular stem are protected against accidental breaking or damage.

Another purpose of the invention is to increase the accuracy and efficiency of such an instrument by encasing the bimetallic coil in a heavy, viscous liquid film or coating that has a dampening effect and possesses substantially the same viscosity characteristic at all temperatures within the range of the instrument, so that the bimetallic coil is equally responsive and sensitive and will give an immediate reading for temperature changes at all points of the scale from —70° C. to +50° C. or higher, the liquid coating being of such a character as not to slow down the action of the bimetallic coil at extremely low temperatures, while giving it added support and stiffness at all temperatures and dampening its movements.

To these and other ends, the invention consists in the construction and arrangement of parts that will appear clearly from the following description when read in conjunction with the accompanying drawing, the novel features being pointed out in the claims following the specification.

In the drawing:

Fig. 1 is a side elevation of a bimetallic thermometer constructed in accordance with a preferred embodiment of the invention;

Fig. 2 is a front elevation of the same;

Fig. 3 is a longitudinal sectional view;

Fig. 4 is a transverse sectional view on line 4—4 of Fig. 3;

Fig. 5 is a transverse sectional view on line 5—5 of Fig. 3, and

Fig. 6 is a transverse sectional view on line 6—6 of Fig. 3 through the attaching nut and sunshield.

Referring more particularly to the drawing in which like reference numerals refer to the same parts throughout the several views, the invention is illustrated as embodied in a thermometer construction that includes a tubular support consisting of a body portion 1 threaded exteriorly at 2 and having secured adjacent to its inner end the usual case or housing 3 that receives the dial and indicator.

The dial plate is designated at 4 and is held in place against the adjacent end of the support 1 by means of a sleeve 5 that is driven into the hollow support 1 and has a flange 6 that overlies the dial plate 4. By this means the dial plate 4 is held tightly in position against the bottom of the case and the adjacent end of the support 1, but at the same time can be turned slightly, as by means of a key inserted into a recess provided in the dial plate for the purpose, to permit bringing the dial exactly to the proper position for calibrating the instrument, after which the sleeve 5 holds the dial plate securely and permanently in such adjusted position.

The sleeve 5 has a reduced interior diameter at its outer end affording a bearing for the indicator shaft 8 which carries the usual indicator or pointer 9, and is supported near its outer end by a second bearing that will be described presently. The indicator shaft 8 is preferably formed of stainless steel hollow tubing such as employed in the manufacture of hypodermic needles, thus affording a stronger shaft with an extremely smooth finish and permitting the use of larger supporting bearings which increases the efficiency and accuracy of the instrument as a whole.

At its outer end the support 1 is provided with an extremity of reduced diameter 10 to which is attached the tube or hollow stem 11, the reduced end 10 of the support 1 having an inside diameter less than that of the body portion of the support and but slightly greater than the indicator shaft 8, while 12 designates a second bearing for the indicator shaft located near the outer end of the latter and suitably secured within the tube or hollow stem 11.

Immediately beyond the bearing 12, the indicator shaft 8 is bent outwardly as at 13 to afford a radially offset extremity 14 that is welded to the inner surface of the adjacent convolution of the bimetallic coil 15, the opposite end of the latter being secured to the plug 16 attached within the outer end of the tube or stem 11.

To accomplish this, the plug 16 is provided at its inner end with a cylindrical attaching portion that is upset to provide the upper part 18, the outer surface 19 of which is welded to the inner surface of the adjacent convolution of the bimetallic coil while the bottom surface 21 of the attaching portion is spaced inwardly from the inner surface of the bimetallic coil to permit contracting movements of the latter. The bimetallic coil is so positioned in relation to the indicator shaft and plug as to maintain a true concentric relation therewith and since the ends of the bimetallic coil are permanently welded to the plug and shaft at points along the inner periphery of the coil without the necessity of any radially or angularly bent portions of the bimetallic coil, the expanding and contracting movements of the latter are transmitted accurately to the indicator shaft without any distortion, and this relationship is permanently maintained throughout the life of the instrument.

In order to dampen and give additional support to the bimetallic coil, to protect it from vibratory effects or jars, and to increase conductivity from the stem to the coil, the latter is surrounded with a film of heavy viscous liquid that adheres to the coil and fills the spaces between its convolutions. One liquid that has been used successfully for this purpose is known commercially as Dow Corning fluid No. 190, which is manufactured and sold by Dow Corning Chemical Company, Midland, Michigan. Such liquid dampens movements of the coil due to other than temperature changes and has a tendency to strengthen the coil, the liquid having a viscosity characteristic that is substantially constant under all conditions, there being no appreciable change in the viscosity of the liquid throughout the range of the instrument between —70° C. and +50° C. or higher. Dow Corning fluid No. 190, referred to above, is characterized by a silicon base, and any damping liquid with a silicon base, of this same general character, is satisfactory for the purpose. Thus the instrument is equally sensitive and will give an accurate reading at practically the same speed throughout the entire range of the scale. The liquid surrounding the coil is so heavy that it has little tendency to exude from the coil chamber and any slight amount that may get through is effectually barred from passing along the indicator shaft and reaching the indicator case by the bearing 12, the reduced inner diameter of extremity 10 surrounding the shaft, and the bearing 5 at the inner end of the shaft.

It is essential to protect the bimetallic coil and stem from direct effects of the sun, and to this end there is provided a sunshield 23 of tubular form surrounding and spaced from the stem 11 and provided with openings 24 through which air has access to the tube 11 and inwardly upset portions 25 that engage the outer surface of the tube 11 and hold the sunshield 23 in proper spaced relation.

The sunshield 23 is secured at its inner end to the inner cylindrical surface of a collar 26 that is part of the nut 27 which has threaded engagement with the exterior of the support 1, and when tightened clamps the body of the support in place against a metal washer 28 and rubber washer 29 located against the windshield or panel to which the instrument is attached. It will be understood that the indicator and case are located on the inside of the panel while the thermometer stem, bimetallic coil and other parts just described extend through and outside the panel in front thereof when the instrument is employed on aircraft.

The interior diameter of collar 26 to which the sunshield is attached by soldering, or in some other suitable fashion, is somewhat greater than the outside diameter of the threaded portion of the support 1 so that the sunshield may clear such threaded portion and the body of the support when the nut is secured in place while at the same time the sunshield is spaced sufficiently from the stem or tube 11 to permit free circulation of air therebetween.

This construction has the definite advantage over earlier sunshield attachments of affording greater protection and safety for the thermometer stem and bimetallic coil since if the sunshield is struck or hit, the blow is not transmitted to the thermometer stem and bimetallic coil, but the strain is transmitted directly to the nut 27 and thence to the support 1, thus greatly reducing the likelihood of accidental damage to the bimetallic coil and surrounding stem, as these parts are mounted upon the support independently of the sunshield.

While the invention has been described with reference to the particular structure disclosed herein, it is not limited in its application to the details set forth, and this application is intended to cover such departures or modifications as may come within the purposes of the invention and the scope of the following claims.

We claim:

1. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into said tubular stem, a bearing for the indicator shaft separate from said tubular stem and located near the outer end of the shaft and secured in said tubular stem, the inner diameter of said outer end of the support being but slightly larger than the indicator shaft, a bearing for the inner end of the indicator shaft separate from said support and located adjacent to the inner end of the support, and a bimetallic helical coil located within said tubular stem and having its ends rigidly connected to the plug and indicator shaft respectively.

2. A bimetallic thermometer including a hollow support, a tubular stem with one end surrounding and attached to the outer end of the support, a plug secured in the opposite end of the tubular stem, an indicator shaft extending through said support into said tubular stem, a bearing for the indicator shaft located near its outer end and secured in said tubular stem, a bearing for the inner end of the indicator shaft located adjacent to the inner end of the support, a bimetallic helical coil located within said tubular stem and having its ends rigidly connected to the plug and indicator shaft respectively, and a coating over the outer surface of the bimetallic coil of viscous liquid having substantially the same viscosity at temperatures between —70° C. and +50° C. or higher.

3. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into said tubular stem, the outer end of the indicator shaft being offset radially from the axis of the shaft, a bearing for the indicator shaft separate from said tubular stem and located adjacent to the outer end of the shaft and secured in said tubular stem, a bearing for the inner end of the indicator shaft separate from said support and located adjacent to the inner end of the support, and a bimetallic helical coil located within said tubular stem and having its ends welded to the plug and to the outer end of the indicator shaft respectively at points along the inner periphery of the coil.

4. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into said tubular stem, the outer end of the indicator shaft being offset radially from the axis of the shaft, a bearing for the indicator shaft separate from said tubular stem and located adjacent to the outer end of the shaft and secured in said tubular stem, a bearing for the inner end of the indicator shaft separate from said support and located adjacent to the inner end of the support, a bimetallic helical coil located within said tubular stem and having its ends welded to the plug and to the outer end of the indicator shaft respectively at points along the inner periphery of the coil, and a coating over the outer surface of the bimetallic coil of viscous liquid having substantially the same viscosity at temperatures between —70° C. and +50° C. or higher.

5. A bimetallic thermometer including a hollow support having an exteriorly threaded body portion and an outer end of reduced diameter, an elongated tubular stem with one end surrounding and attached to said outer end of the support, a plug secured in the opposite end of the tubular stem and provided with an upset portion affording an outer surface adjacent to the bimetallic coil, an indicator shaft extending through said support and for a substantial distance into said tubular stem, the outer end of the indicator shaft being offset radially from the axis of the shaft, a bearing for the indicator shaft separate from said tubular stem and located adjacent to the outer end of the shaft and secured in said tubular stem, a bearing for the inner end of the indicator shaft separate from said support and located adjacent to the inner end of the support, and a bimetallic helical coil located within said tubular stem and having its ends welded to said outer surface on the upset portion of the plug and to the offset outer end of the indicator shaft respectively at points along the inner periphery of the coil.

6. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into said tubular stem, the outer end of the support having an elongated opening of reduced diameter through which the indicator shaft extends, the outer end of the indicator shaft being offset radially from the axis of the shaft, a bearing for the indicator shaft separate from said tubular stem and located adjacent to the outer end of the shaft and secured within said tubular stem, a bearing for the inner end of the indicator shaft separate from said support and located adjacent to the inner end of the support, a bimetallic helical coil located within said tubular stem and having its ends welded to the plug and to the outer end of the indicator shaft respectively at points along the inner periphery of the coil, and a coating over the outer surface of the bimetallic coil of viscous liquid which has substantially the same viscosity at temperatures between —70° C. and +50° C. or higher.

7. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into the tubular stem, the outer end of the support having an elongated opening of reduced diameter through which the indicator shaft extends, a bearing for the indicator shaft separate from said tubular stem and located adjacent to the outer end of the shaft and secured within said tubular stem, a bearing for the inner end of the indicator shaft separate from said support and located adjacent to the inner end of the support, a bimetallic helical coil located within said tubular stem and having its ends rigidly connected to the plug and to the outer end of the indicator shaft respectively, and a coating over the outer surface of the bimetallic coil of viscous liquid having substantially the same viscosity at temperatures between —70° C. and +50° C. or higher.

8. A bimetallic thermometer including a hollow support having an exteriorly threaded body portion and an outer end of reduced diameter, an elongated tubular stem with one end surrounding and attached to said outer end of the support, a plug secured in the opposite end of the tubular stem, an indicator shaft extending through said support and for a substantial distance into said tubular stem, a bearing for the indicator shaft separate from said tubular stem and located near the outer end of the shaft and secured in said tubular stem, a bearing for the inner end of the indicator shaft separate from said support and located adjacent to the inner end of the support, a bimetallic helical coil located within said tubular stem and having its ends rigidly connected to the plug and indicator shaft respectively, and a coating over the outer surface of the bimetallic coil of viscous liquid having substantially the same viscosity at temperatures between —70° C. and +50° C. or higher.

9. A bimetallic thermometer including a hollow support, an elongated tubular stem with one end surrounding and attached to the outer end of the support, a plug secured in the opposite end of the tubular stem, an indicator shaft extending through said support and for a substantial distance into said tubular stem, the outer end of the indicator shaft being offset radially from the axis of the shaft, a bearing for the indicator shaft separate from said tubular stem and located adjacent to the outer end of the shaft and secured in said tubular stem, a bearing for the inner end of the indicator shaft separate from said support and located adjacent to the inner end of the support, a bimetallic helical coil located within said tubular stem and having its ends welded to the plug and to the outer end of the indicator shaft respectively at points along the inner periphery of the coil, and a coating over the outer surface of the bimetallic coil of viscous liquid having substantially the same viscosity at temperatures between −70° C. and +50° C. or higher.

10. A bimetallic thermometer including a hollow support, an elongated tubular stem with one end surrounding and attached to the outer end of the support, a plug secured in the opposite end of the tubular stem, an indicator shaft extending through said support and for a substantial distance into said tubular stem, the outer end of the support having an elongated opening of reduced diameter through which the indicator shaft extends, the outer end of the indicator shaft being offset radially from the axis of the shaft, a bearing for the indicator shaft separate from said tubular stem and located adjacent to the outer end of the shaft and secured within said tubular stem, a bearing for the inner end of the indicator shaft separate from said support and located adjacent to the inner end of the support, a bimetallic helical coil located within said tubular stem and having its ends welded to the plug and to the outer end of the indicator shaft respectively at points along the inner periphery of the coil, and a coating over the outer surface of the bimetallic coil of viscous liquid which has substantially the same viscosity at temperatures between −70° C. and +50° C. or higher.

11. A bimetallic thermometer including a hollow support having an exteriorly threaded body portion and an outer end of reduced diameter, a tubular stem with one end surrounding and attached to said outer end of the support, a plug secured in the opposite end of the tubular stem, an indicator shaft extending through said support and into said tubular stem, the outer end of the indicator shaft being offset radially from the axis of the shaft, a bearing for the indicator shaft located adjacent to its outer end and secured within said tubular stem, a bearing for the inner end of the indicator shaft secured within the inner end of the support, a bimetallic helical coil located within said tubular stem and having its ends welded to the plug and to the outer end of the indicator shaft respectively at points along the inner periphery of the coil, the bearing at the inner end of the shaft having a flange overlying the adjacent end of said support, and a dial plate secured between said bearing flange and the end of the support and adjustable therebetween for calibration.

12. A bimetallic thermometer including a hollow support, a tubular stem with one end surrounding and attached to the outer end of the support, a plug secured in the opposite end of the tubular stem, an indicator shaft extending through said support into said tubular stem, a bearing for the indicator shaft located near its outer end and secured in said tubular stem, a bearing for the inner end of the indicator shaft secured within the inner end of the support, a bimetallic helical coil located within said tubular stem and having its ends rigidly attached to the plug and to the outer end of the indicator shaft respectively, the bearing at the inner end of the support having a flange overlying the adjacent end of said support, and a dial plate secured between said bearing flange and the end of the support and adjustable therebetween for calibration.

13. A bimetallic thermometer including a hollow support having an exteriorly threaded body portion and an outer end of reduced diameter, a tubular stem surrounding and attached to said outer end of the support, a plug secured in the opposite end of the tubular stem, an indicator shaft extending through said support and into said tubular stem, the outer end of the indicator shaft being offset radially from the axis of the shaft, a bearing for the indicator shaft located near its outer end and secured within said tubular stem, a bearing for the inner end of the indicator shaft located adjacent to the inner end of the support, a bimetallic helical coil located within said tubular stem and having its ends welded to the plug and to the outer end of the indicator shaft respectively at points along the inner periphery of the coil, a fastening nut threaded on said body portion of the support, said nut having an outer end portion with a cylindrical inner surface of greater diameter than the threaded portion of the support, and a sunshield surrounding said tubular stem and secured to said cylindrical inner surface of the nut, the interior diameter of the sunshield being greater than the diameter of said threaded portion on the support.

14. A bimetallic thermometer including a hollow support having an exteriorly threaded body portion and an outer end of reduced diameter, a tubular stem surrounding and attached to said outer end of the support, a plug secured in the opposite end of the tubular stem, an indicator shaft extending through said support and into said tubular stem, a bearing for the indicator shaft located near its outer end and secured within said tubular stem, a bearing for the inner end of the indicator shaft located adjacent to the inner end of the support, a bimetallic helical coil located within said tubular stem and having its ends rigidly attached to the plug and to the outer end of the indicator shaft respectively, a fastening nut threaded on said body portion of the support, said nut having an outer end portion with a cylindrical inner surface of greater diameter than the threaded portion of the support, and a sunshield surrounding said tubular stem and secured to said cylindrical inner surface of the nut, the interior diameter of the sunshield being greater than the diameter of said threaded portion on the support.

15. A bimetallic thermometer including a hollow support having an exteriorly threaded body portion and an outer end portion of reduced diameter, a tubular stem with one end surrounding and attached to the outer end of the support, a plug secured in the opposite end of the tubular stem, an indicator shaft extending through said support into said tubular stem, a bearing for the indicator shaft located near its outer end and secured within said tubular stem, a bearing for the inner end of the indicator shaft located adjacent to the inner end of the support, a bimetallic helical coil located within said tubular stem and having its ends rigidly attached to the plug and to the outer end of the indicator shaft respectively, a fastening nut secured to said threaded body portion of the support and having an outer end with a cylindrical inner surface, and a sunshield surrounding said tubular stem and secured to said cylindrical inner surface of the nut.

GEORGE E. FORD.
WARREN W. HASTINGS.